US012563036B2

(12) United States Patent
Zhou et al.

(10) Patent No.: US 12,563,036 B2
(45) Date of Patent: Feb. 24, 2026

(54) DISTRIBUTED MANAGEMENT SYSTEM AND MANAGEMENT METHOD FOR SMART CARD MANAGEMENT APPARATUSES

(71) Applicant: SHANGHAI TUGE DATA TECHNOLOGY CO., LTD., Shanghai (CN)

(72) Inventors: Linlin Zhou, Shanghai (CN); Kaihang Wang, Shanghai (CN); Hao Zhou, Shanghai (CN)

(73) Assignee: SHANGHAI TUGE DATA TECHNOLOGY CO., LTD., Shanghai (CN)

( * ) Notice: Subject to any disclaimer, the term of this patent is extended or adjusted under 35 U.S.C. 154(b) by 313 days.

(21) Appl. No.: 18/033,065

(22) PCT Filed: Oct. 14, 2021

(86) PCT No.: PCT/CN2021/123685
§ 371 (c)(1),
(2) Date: Sep. 28, 2023

(87) PCT Pub. No.: WO2022/083492
PCT Pub. Date: Apr. 28, 2022

(65) Prior Publication Data
US 2024/0283789 A1 Aug. 22, 2024

(30) Foreign Application Priority Data
Oct. 22, 2020 (CN) .......................... 202011135399.6

(51) Int. Cl.
G06F 21/33 (2013.01)
H04L 9/40 (2022.01)
H04W 4/02 (2018.01)

(52) U.S. Cl.
CPC ...... *H04L 63/0853* (2013.01); *H04L 63/0281* (2013.01); *H04W 4/02* (2013.01)

(58) Field of Classification Search
CPC ... H04L 63/0853; H04L 63/0281; H04W 4/02
(Continued)

(56) References Cited

U.S. PATENT DOCUMENTS

| | | | |
|---|---|---|---|
| 8,521,084 B2 * | 8/2013 | Wane | G06Q 20/3574 |
| | | | 705/13 |
| 9,965,797 B1 * | 5/2018 | Poole | G06Q 30/0639 |

(Continued)

FOREIGN PATENT DOCUMENTS

| | | |
|---|---|---|
| CN | 103312809 A | 9/2013 |
| CN | 104394522 A | 3/2015 |

(Continued)

*Primary Examiner* — Haresh N Patel
(74) *Attorney, Agent, or Firm* — Ming Jiang; MM IP SERVICES LLC

(57) ABSTRACT

Disclosed are a distributed management system for smart card management apparatuses and a management method therefor. The system includes: a service provision apparatus belonging to a service center, a plurality of smart card management apparatuses, and a plurality of terminals; wherein the service provision apparatus includes a service provision center and one or a plurality of proxy modules, and in the case that each of the plurality of terminals and a smart card management module are registered in the service provision center, the smart card management apparatus authenticates the terminal by a proxy module assigned by the service provision center, such that the terminal accesses a network servicing the terminal.

4 Claims, 10 Drawing Sheets

(58) Field of Classification Search
USPC .......................................................... 726/9
See application file for complete search history.

(56) References Cited

U.S. PATENT DOCUMENTS

| | | | | |
|---|---|---|---|---|
| 9,967,247 | B2 * | 5/2018 | Chastain | H04W 12/086 |
| 9,973,940 | B1 * | 5/2018 | Rappaport | H04B 3/46 |
| 9,983,982 | B1 * | 5/2018 | Kumar | G06F 11/3688 |
| 9,992,062 | B1 * | 6/2018 | Hankins | H04L 41/0813 |
| 9,998,172 | B1 * | 6/2018 | Barzegar | H01Q 13/02 |
| 9,998,870 | B1 * | 6/2018 | Bennett | H04B 17/318 |
| 11,538,019 | B1 * | 12/2022 | Ferenczi | H04L 9/30 |
| 11,587,673 | B2 * | 2/2023 | Pillai | H05B 47/175 |
| 2012/0278614 | A1 * | 11/2012 | Choi | H04W 12/068 |
| | | | | 713/173 |
| 2013/0139230 | A1 * | 5/2013 | Koh | G06Q 20/3278 |
| | | | | 726/5 |
| 2013/0178159 | A1 * | 7/2013 | Xie | G06Q 20/227 |
| | | | | 455/41.1 |
| 2020/0364529 | A1 * | 11/2020 | Garrett | G06Q 20/3229 |
| 2023/0088955 | A1 * | 3/2023 | Kim | H04W 76/30 |
| | | | | 370/329 |
| 2023/0111451 | A1 * | 4/2023 | Purkayastha | H04W 24/10 |
| | | | | 370/329 |

FOREIGN PATENT DOCUMENTS

| | | | | |
|---|---|---|---|---|
| CN | 104378752 | A | 4/2016 | |
| CN | 105812370 | A | 7/2016 | |
| CN | 105813072 | A | 7/2016 | |
| CN | 105848152 | A | 8/2016 | |
| CN | 107404509 | A | 11/2017 | |
| CN | 112019573 | A | 12/2020 | |
| CN | 112134744 | A | 12/2020 | |
| EP | 2824945 | A | 1/2015 | |
| EP | 1905189 | B1 * | 1/2020 | H04L 63/08 |

* cited by examiner

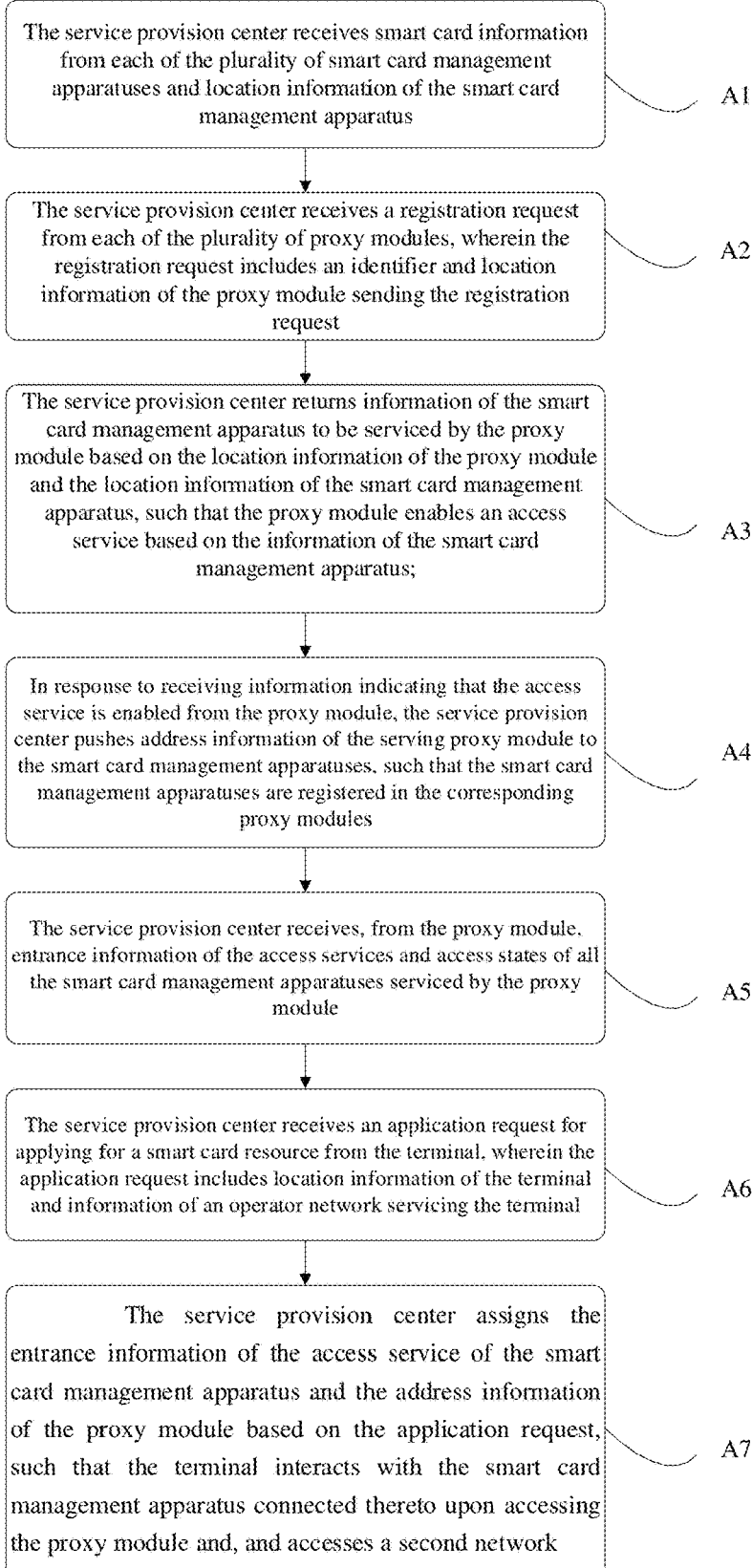

The service provision center receives smart card information from each of the plurality of smart card management apparatuses and location information of the smart card management apparatus

A1

The service provision center receives a registration request from each of the plurality of proxy modules, wherein the registration request includes an identifier and location information of the proxy module sending the registration request

A2

The service provision center returns information of the smart card management apparatus to be serviced by the proxy module based on the location information of the proxy module and the location information of the smart card management apparatus, such that the proxy module enables an access service based on the information of the smart card management apparatus;

A3

In response to receiving information indicating that the access service is enabled from the proxy module, the service provision center pushes address information of the serving proxy module to the smart card management apparatuses, such that the smart card management apparatuses are registered in the corresponding proxy modules

A4

The service provision center receives, from the proxy module, entrance information of the access services and access states of all the smart card management apparatuses serviced by the proxy module

A5

The service provision center receives an application request for applying for a smart card resource from the terminal, wherein the application request includes location information of the terminal and information of an operator network servicing the terminal

A6

The service provision center assigns the entrance information of the access service of the smart card management apparatus and the address information of the proxy module based on the application request, such that the terminal interacts with the smart card management apparatus connected thereto upon accessing the proxy module and, and accesses a second network

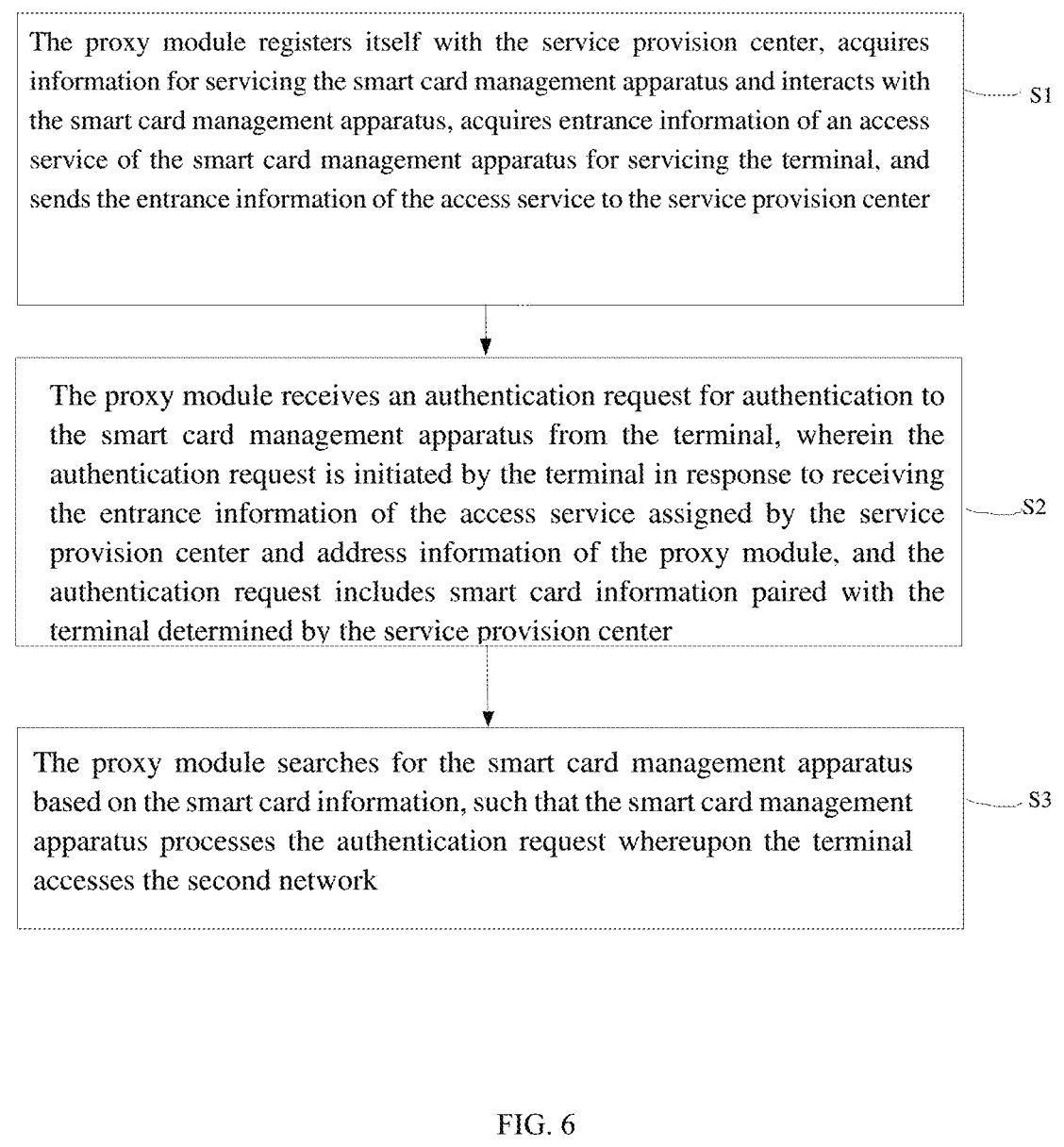

The proxy module registers itself with the service provision center, acquires information for servicing the smart card management apparatus and interacts with the smart card management apparatus, acquires entrance information of an access service of the smart card management apparatus for servicing the terminal, and sends the entrance information of the access service to the service provision center ~~~ S1

↓

The proxy module receives an authentication request for authentication to the smart card management apparatus from the terminal, wherein the authentication request is initiated by the terminal in response to receiving the entrance information of the access service assigned by the service provision center and address information of the proxy module, and the authentication request includes smart card information paired with the terminal determined by the service provision center ~~~ S2

↓

The proxy module searches for the smart card management apparatus based on the smart card information, such that the smart card management apparatus processes the authentication request whereupon the terminal accesses the second network ~~~ S3

FIG. 6

DISTRIBUTED MANAGEMENT SYSTEM AND MANAGEMENT METHOD FOR SMART CARD MANAGEMENT APPARATUSES

FIELD

Embodiments of the present disclosure relate to the technical field of smart card extension, and in particular, relate to a distributed management system for smart card management apparatuses, and a management method therefor.

BACKGROUND

In the industry of cloud communications, typically a smart card management apparatus is desired to manage a large number of smart cards. In this industry, the smart cards are not only credentials to provide services to customers, but also tangible assets of a company in the industry. Therefore, how to take full advantage of these smart card resources has always been one of the subjects that are being studied in the industry. How to effectively manage a large number of smart cards is the premise of maximizing resource utilization. The related art provides a service architecture for managing smart cards, as illustrated in FIG. 1. The architecture in FIG. 1 mainly includes three independent modules:

1) Service provision module: is designed to process service-related operations, including: validity verification of a terminal device, graphical presentation of a smart card management apparatus, centralized allocation of smart card resources, and the like.

2) Smart card management apparatus: is designed to collect smart card information in the smart card management apparatus, and perform permission verification on network access of each terminal.

3) Terminal: is a product ultimately leased or sold to a user to provide the user with network access.

With reference to (1) to (6) in FIG. 1, the process mainly includes the following three stages:

First stage: (1) The smart card management device collects all the smart card information thereunder and reports the collected information to the service provision module for subsequent centralized allocation and use. The service provision module performs identity verification on the smart card management apparatus, and records information reported and also records location information thereof (such as an IP address) upon successful verification.

(2) Upon completing the information recording, the service provision module pushes a corresponding state to the smart card management apparatus and notifies the smart card management apparatus to provide services to the outside, and thereafter the smart card management apparatus and the service provision module continues to maintain contact therebetween to synchronize change information in real time. The first phase is now complete.

Phase II: (3) Upon being started by a user, the terminal starts communicating with a service provision module and applies for smart card resources.

(4) Upon confirming the identity of the terminal, the service provision module allocates smart card resources to the terminal, notifies the terminal of the resource position thereof, and synchronizes the information to a smart card management apparatus to perform identity authentication on a subsequent terminal when applying for services. Thereafter, contact is maintained between the terminal and the service provision module to synchronize the change information in real time. The second stage is now complete.

Phase III: (5) Upon acquiring the smart card resources, the terminal initiates a service application to the smart card management apparatus according to the location information thereof.

(6) Upon receiving the service application from the terminal, the smart card management apparatus performs identity authentication on the terminal, and starts to provide services to the terminal upon confirming the identity, and finally realizes network access of the terminal.

That is, the terminal in FIG. 1 itself supports two network access modes. One is that the terminal is capable of directly accessing a first network and communicating with the service provision module and the smart card management apparatus over the first network. The other is that the terminal may access a second network on the prerequisite of accessing the first network and communicating with the service provision module and the smart card management apparatus, and be ultimately provided for a user.

Specifically, advantages of the conventional architecture illustrated in FIG. 1 are that the architecture is simple and easy to deploy. However, WITH THE DEEPENING OF INDUSTRY DEVELOPMENT AND WIDE ACCEPTANCE OF APPLICATION REQUIREMENTS, the drawbacks of this architecture are gradually enlarged. The main drawbacks are as follows:

1) The smart card management apparatus needs to have a fixed IP address.

2) The requirements of the fixed IP address give two options to the installation environment of the smart card management apparatus: buying a fixed IP address and a dedicated line for the smart card management apparatus; or placing the smart card management apparatus in the IDC equipment room to have a fixed IP address. Therefore, the use cost is greatly increased.

3) Since the smart card management apparatuses are generally placed centrally in an IDC equipment room around the world, and the terminals are distributed around the world, network routing from the smart card management apparatuses to the terminals fails to be optimized (for example, the smart card management apparatuses are in Shanghai, while the terminals are in New York, Tokyo, Paris, and the like).

4) To solve the third problem, an effective method is to rent the IDC equipment room to install the smart card management apparatuses in the world. However, the installation, operation and maintenance, rent fees and other expenses greatly increase the operation cost of the product.

5) In the current architecture pattern, the smart card management apparatus typically adopts a fixed node service entrance, even a single node entrance. Therefore, disaster tolerance of the entire service is greatly reduced. That is, when the entry node fails, all the smart card management apparatuses cannot provide services to the outside. Therefore, this failure completely disrupts the operation of the entire product.

In addition to the above limitations, in the aspect of service developments, more and more agents or large and medium-sized customers have a demand for local management of smart cards with in-depth cooperation with global agents. As a result, the current solutions naturally fail to meet this need.

SUMMARY

To solve the problem in the related art, one or more embodiments of the present disclosure provide a distributed management system for smart card management apparatuses and a management method therefor to achieve flexible deployment of the smart card management apparatuses and reduce operation costs.

In a first aspect, the embodiments of the present disclosure provide a distributed management system for smart card management apparatuses. The system includes:

a service provision apparatus belonging to a service center, a plurality of smart card management apparatuses, and a plurality of terminals;

wherein the service provision apparatus includes a service provision center and one or a plurality of proxy modules, and in the case that each of the plurality of terminals and a smart card management module are registered in the service provision center, the smart card management apparatus authenticates the terminal by a proxy module assigned by the service provision center, such that the terminal accesses a network servicing the terminal;

wherein the smart card management apparatus configured to authenticate the terminal is located in a region where the terminal is located, and each of the plurality of proxy modules is connected to the plurality of smart card management apparatuses that are distributively deployed.

In some embodiments, in the case that one proxy module is provided, the proxy module and the service provision center are both located in an IDC equipment room and share a same public network address (that is, IP address), and each of the plurality of smart card management apparatuses located in the region where the terminal is located is assigned a pre-configured public network address (that is, IP address).

In some embodiments, in the case that a plurality of proxy modules are provided, the service provision center is located in an IDC equipment room or at a cloud end, the plurality of proxy modules are distributively deployed according to the region where the terminal is located, and each of the plurality of proxy modules is assigned a pre-configured public IP address; and the smart card management apparatus connected to each of the plurality of proxy modules is assigned an internal network address, and the proxy module is implemented as the smart card management apparatus authenticating the terminal and is in point-to-point/end-to-end communication with the terminal.

In some embodiments, the proxy module is further configured to forward interaction data between the smart card management apparatus and the service provision center; and all the plurality of proxy modules connected to the service provision center form a star topological structure, and any two of the plurality of proxy modules are interconnected and interworked, and/or the service provision center is located at a cloud end or a hybrid cloud of a service provider.

In a second aspect, the embodiments of the present disclosure provide a management method for a distributed management system. The system includes: a plurality of proxy modules that are distributively deployed, assigned a public network address, and connected to a service provision center, each of the plurality of proxy modules being connected to a plurality of smart card management apparatuses assigned an internal network address; and a plurality of terminals configured to access the network (that is, a second network) servicing the terminals. The method includes:

S1, registering, by the proxy module, with the service provision center, acquiring information for servicing the smart card management apparatus and interacting with the smart card management apparatus based on the information, acquiring entrance information of an access service of the smart card management apparatus for servicing the terminal, and sending the entrance information of the access service to the service provision center;

S2, receiving, by the proxy module, an authentication request for authentication to the smart card management apparatus from the terminal, wherein the authentication request is initiated by the terminal in response to receiving the entrance information of the access service assigned by the service provision center and address information of the proxy module, and the authentication request includes smart card information paired with the terminal determined by the service provision center; and S3, searching for, by the proxy module, the smart card management apparatus based on the smart card information, such that the smart card management apparatus processes the authentication request whereupon the terminal accesses the second network.

In some embodiments, S1 includes:

initiating, by the proxy module, a registration request to the service provision center, wherein the registration request includes an identifier and location information of the proxy module;

receiving, by the proxy module, a registration response and the information for servicing the smart card management apparatus from the service provision center, and enabling the access service based on the information;

receiving, by the proxy module, an access registration message from the smart card management apparatus, wherein the access registration message is initiated by the smart card management apparatus based on the address information of the proxy module pushed by the service provision center; and feeding back, by the proxy module, registration state information based on the access registration message, establishing a connection to the smart card management apparatus, and synchronizing an access state of the smart card management apparatus and the entrance information of the access service for servicing the terminal to the service provision center.

In some embodiments, S3 includes:

determining, by the proxy module, whether the smart card management apparatus and the terminal are located in a full cone NAT network environment based on a pre-acquired network environment of the smart card management apparatus and the terminal;

in response to determining that the smart card management apparatus and the terminal are located in the full cone NAT network environment, sending the address information of the terminal to the smart card management apparatus, such that the terminal and the smart card management apparatus are in direct communication for authentication of the terminal;

in response to determining that the smart card management apparatus or the terminal is not located in the full cone NAT network environment, forwarding, by the proxy module, the authentication request to the searched smart card management apparatus; and receiving, by the proxy module, a processing result of the authentication request from the smart card management apparatus, and sending the processing result to the terminal whereupon the terminal accesses the second network;

wherein the network environment of the smart card management apparatus is information carried in the access registration message initiated by the smart card management apparatus; and wherein the network environment of the terminal is information carried in the authentication request initiated by the terminal.

In some embodiments, the method further includes:

periodically sending, by the proxy module, heartbeat information containing a state of the proxy module to the service provision center; and/or in response to receiving a connection request from a terminal of a region to which the proxy module does not belong, sending, by the proxy module, information indicating that a proxy module of the region to which the terminal belongs fails to the service provision center.

In a third aspect, the embodiments of the present disclosure further provide a management method for a distributed management system. The system includes: a plurality of proxy modules that are distributively deployed, assigned a public network address (that is, IP address), and connected to a service provision center, each of the plurality of proxy modules being connected to a plurality of smart card management apparatuses assigned an internal network address (that is, IP address); and a plurality of terminals configured to access the network (that is, a second network) servicing the terminals. The method includes:

A1, receiving, by the service provision center, smart card information from each of the plurality of smart card management apparatuses and location information of the smart card management apparatus;

A2, receiving, by the service provision center, a registration request from each of the plurality of proxy modules, wherein the registration request includes an identifier and location information of the proxy module sending the registration request;

A3, returning, by the service provision center, information for servicing the smart card management apparatus based on the location information of the proxy module and the location information of the smart card management apparatus, such that the proxy module enables an access service based on the information of the smart card management apparatus A4, in response to receiving information indicating that the access service is enabled from the proxy module, pushing, by the service provision center, address information of the serving proxy module to the smart card management apparatuses, such that the smart card management apparatuses are registered in the corresponding proxy modules;

A5, receiving from the proxy module, by the service provision center, entrance information of the access services and access states of all the smart card management apparatuses serviced by the proxy module;

A6, receiving, by the service provision center, an application request for applying for a smart card resource from the terminal, wherein the application request includes location information of the terminal and information of an operator network servicing the terminal; and A7, assigning, by the service provision center, the entrance information of the access service of the smart card management apparatus and the address information of the proxy module based on the application request, such that the terminal interacts with the smart card management apparatus connected thereto upon accessing the proxy module and, and accesses a second network.

In some embodiments, the method further includes:

sending, by the service provision center, address information of a first predetermined number of adjacent proxy modules to a registered proxy module according to an interconnection and interworking policy, such that the registered proxy module is in communication with the adjacent proxy module; and/or sending, by the service provision center, address information and priority information of a second predetermined number of proxy modules to a registered smart card management apparatus or terminal according to an interconnection and interworking policy, such that the registered smart card management apparatus or terminal stores the address information of the second predetermined number of proxy modules and selects a proxy module for connection based on the priority information.

Accordingly, in the one or more embodiments of the present disclosure, the smart card management apparatuses are distributively deployed, and deployed in the region where the terminals are located. In this way, flexible deployment of the smart card management apparatus is achieved, and operation costs are reduced.

In addition, in the one or more embodiments of the present disclosure, by virtue of the proxy modules, one proxy module is connected to a plurality of smart card management apparatuses that are distributively deployed. Therefore, the problem in the related art that in a private network environment, deployment of the smart card management apparatuses requires a harsh network environment is addressed, and thus operation costs are reduced.

Further, the distributively deployed proxy modules are interconnected. When some of the proxy modules fail, the other normal proxy modules in the network quickly serve as redundancy nodes of the fault nodes and continue to service the terminals. In this way, the terminals are constantly serviced, and quality of service is also optimized.

BRIEF DESCRIPTION OF THE DRAWINGS

For clearer descriptions of the technical solutions according to the embodiments of the present disclosure or the technical solutions in the related art, hereinafter, drawings that are to be referred for description of the embodiments or the related art are briefly described. Apparently, the drawings described hereinafter merely illustrate some embodiments of the present disclosure. Persons of ordinary skill in the art may also derive other drawings based on the drawings described herein without any creative effort.

FIG. 5 to FIG. 7 are some schematic flowcharts of a management method for a distributed management system according to an embodiment of the present disclosure.

DETAILED DESCRIPTION

For clearer descriptions of the objectives, technical solutions and advantages of the embodiments of the present disclosure clearer, the technical solutions according to the embodiments of the present disclosure are clearly and thoroughly described with reference to the accompanying drawings of the embodiments of the present disclosure. The described embodiments are merely exemplary ones, but are not all the embodiments of the present disclosure. Based on the embodiments of the present disclosure, all other embodiments derived by persons of ordinary skill in the art without any creative efforts shall fall within the protection scope of the present disclosure.

It should be noted that, in this specification, such relationship-related terms as "first" and "second" are only used to differentiate one entity or operation from another entity or operation, but are not intended to require or imply that there is a practical relationship or sequence between these entities or operations.

First Embodiment

Figure 2A:
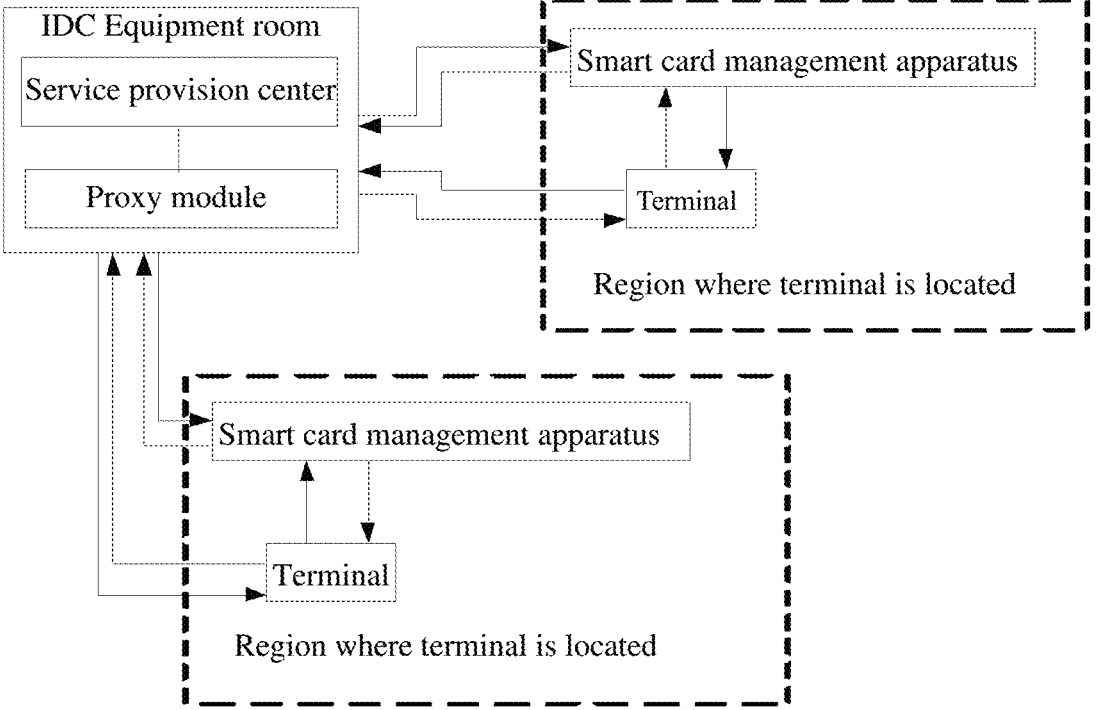
FIG. 2A and FIG. 2B are architecture diagrams of a distributed management system for smart card management apparatuses according to an embodiment of the present disclosure.
Figure 2B:
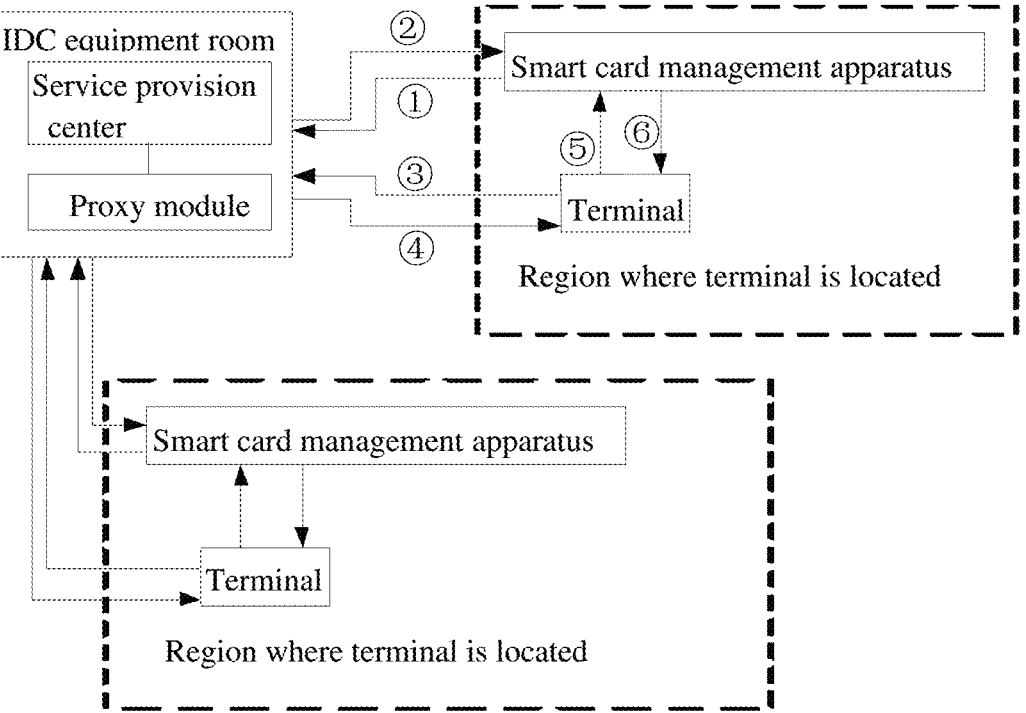

As illustrated in FIG. 2A and FIG. 2B, an architecture diagram of a distributed management system for smart card management apparatuses according to an embodiment of the present disclosure is provided. The system includes: a service provision apparatus belonging to a service center, a plurality of smart card management apparatuses, and a plurality of terminals.

According to this embodiment, the service provision apparatus includes a service provision center and one proxy module, and in the case that each of the plurality of terminals and a smart card management module are registered in the service provision center, the smart card management apparatus authenticates the terminal by a proxy module assigned by the service provision center, such that the terminal accesses a network (hereinafter referred to as a second network) servicing the terminal.

FIG. 2A illustrates two smart card management apparatuses and two terminals.

Neither the number of smart card management apparatuses nor the number of terminals is limited in this embodiment, and the smart card management apparatuses and the terminals may be configured according to actual needs. For example, the proxy module is connected to a plurality of smart card management apparatuses and a plurality of terminals.

In this embodiment, one proxy module is configured, and the proxy module and the service provision center are both located in an IDC equipment room or at a cloud end. The proxy module and the service provision center share the same public network address, for example, an IPv4/IPv6 address. In this case, the proxy module and the service provision center are exhibited as a device in the IDC equipment room, and the proxy module may be understood as being a logic block separated from a conventional service provision module and belonging to the same device but different services.

Figure 1:
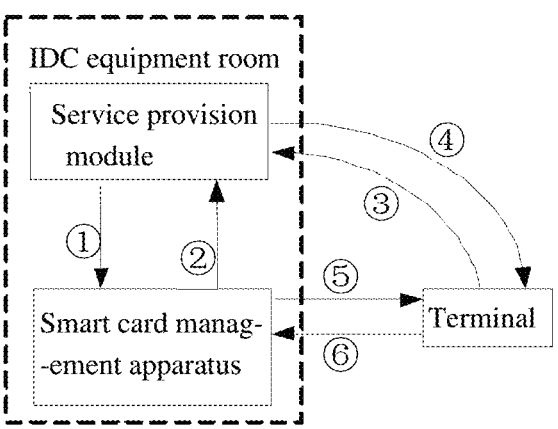
FIG. 1 is a schematic diagram of a service architecture method of smart card management apparatuses in the related art.

In this embodiment, the smart card management apparatuses may be subject to distributed deployment. That is, the smart card management apparatuses are flexibly deployed in the region where the terminals are located. That is, the smart card management apparatuses and the terminals preferentially belong to the same country or region or the same telecommunication operator network. As compared with the conventional technical solution as illustrated in FIG. 1, the smart card management apparatuses are "moved out from" the equipment room, and are preferentially "deployed close to" the terminals, such that flexible deployment of the smart card management apparatuses is achieved. In this way, network routing between the smart card management apparatuses and the terminals is optimized.

In this embodiment, each of the smart card management apparatuses "moved out from" the equipment room is assigned a pre-configured public network address, for example, an IP address. That is, each of the smart card management apparatus in the region where the terminals are located is assigned the pre-configured public network address.

In this embodiment, the smart card management apparatuses may be practiced as authenticating the terminals, such that the terminals access the second network servicing the terminals.

It may be understood that the service provision center and the proxy module may be externally exhibited as a service provision module. Interactions between the smart card management apparatuses and the terminals, and the service provision module in FIG. 2A and FIG. 2B are substantially the same as those in the related art. For details about authentication of the terminals, reference may be made to the processes 1 to 6 in the related art, which is not described herein any further.

For better understanding of the authentication of the terminals according to the embodiments of the present disclosure, description is given with reference to conventional authentication.

Generally, when a terminal accesses an operator network, the operator network needs to authenticate the terminal. In a common mobile phone, a smart card (that is, a SIM card) is mounted in the mobile phone, and by internal process of the terminal, an authentication request is transmitted to the SIM card for operation. A related algorithm and key are pre-configured in the SIM card, such that the operator network is capable of authenticating the mobile phone and hence the mobile phone is capable of accessing the operator network via the smart card therein.

In the technical field of smart card management apparatuses according to the present disclosure, the SIM card is mounted in the smart card management apparatus. When the terminal, in a roaming state, is expected to access the operator network servicing the terminal, an authentication request from the operator network servicing the terminal is transmitted to the smart card management apparatus over a first network, and the authentication is completed on the smart card management apparatus and an authentication response is returned to the terminal, such that the terminal connects to the second network servicing the terminal via the SIM card in the smart card management apparatus.

It should be noted that the first network is a homed operator network of the terminal prior to roaming, and the second network is a homed operator network of the terminal upon roaming. Where the terminal is expected to connect to the second network, the terminal may communicate with the smart card management apparatus over the first network, and hence access the second network.

Second Embodiment

Figure 3A:
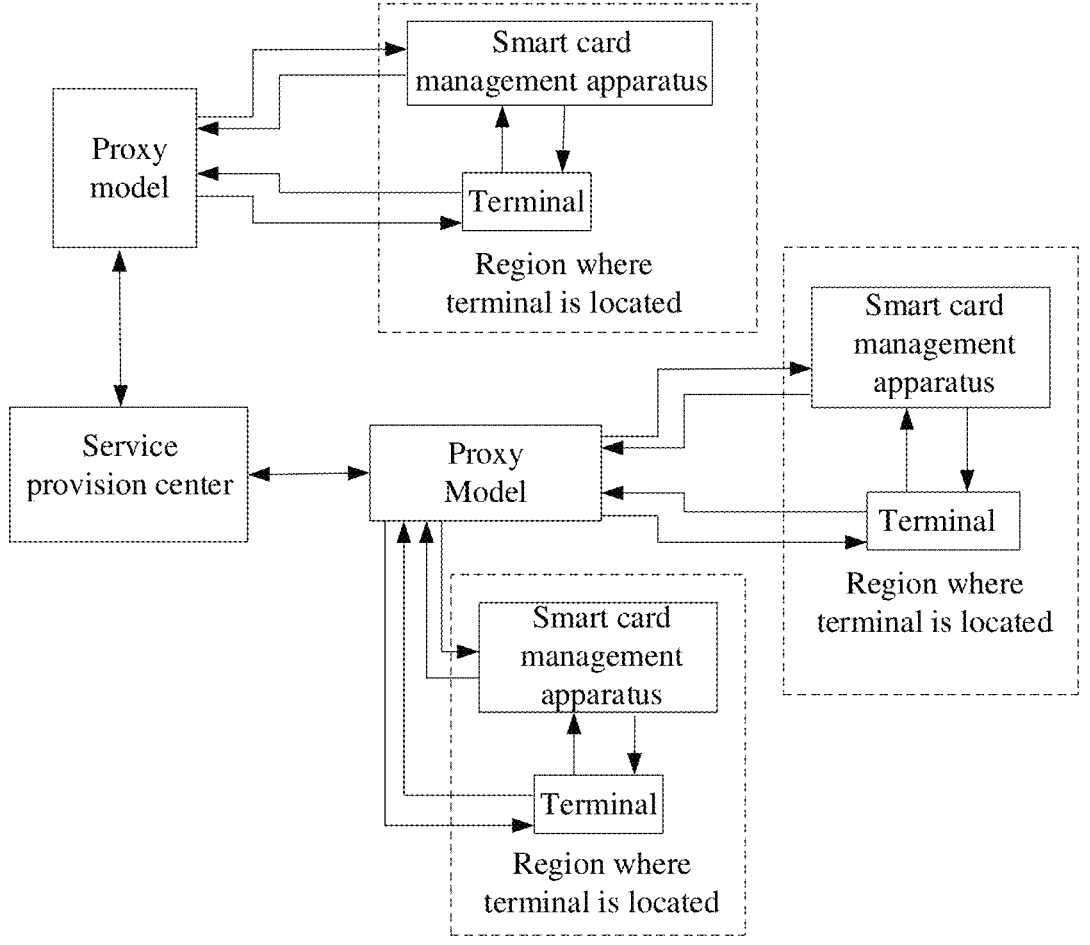
FIG. 3A to FIG. 3C are architecture diagrams of a distributed management system for smart card management apparatuses according to another embodiment of the present disclosure.
Figure 3B:
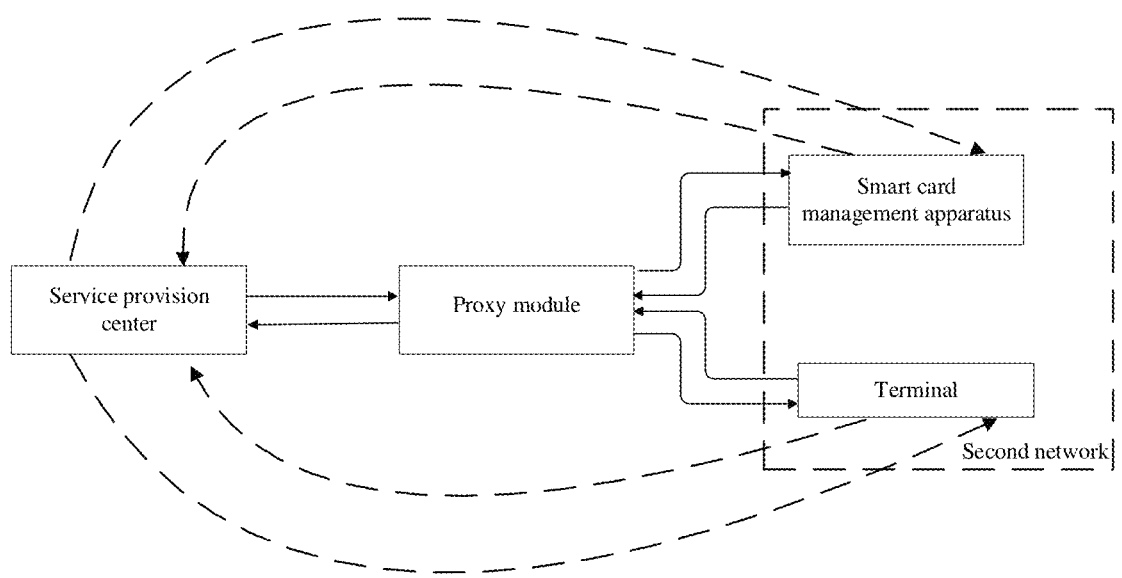
Figure 3C:
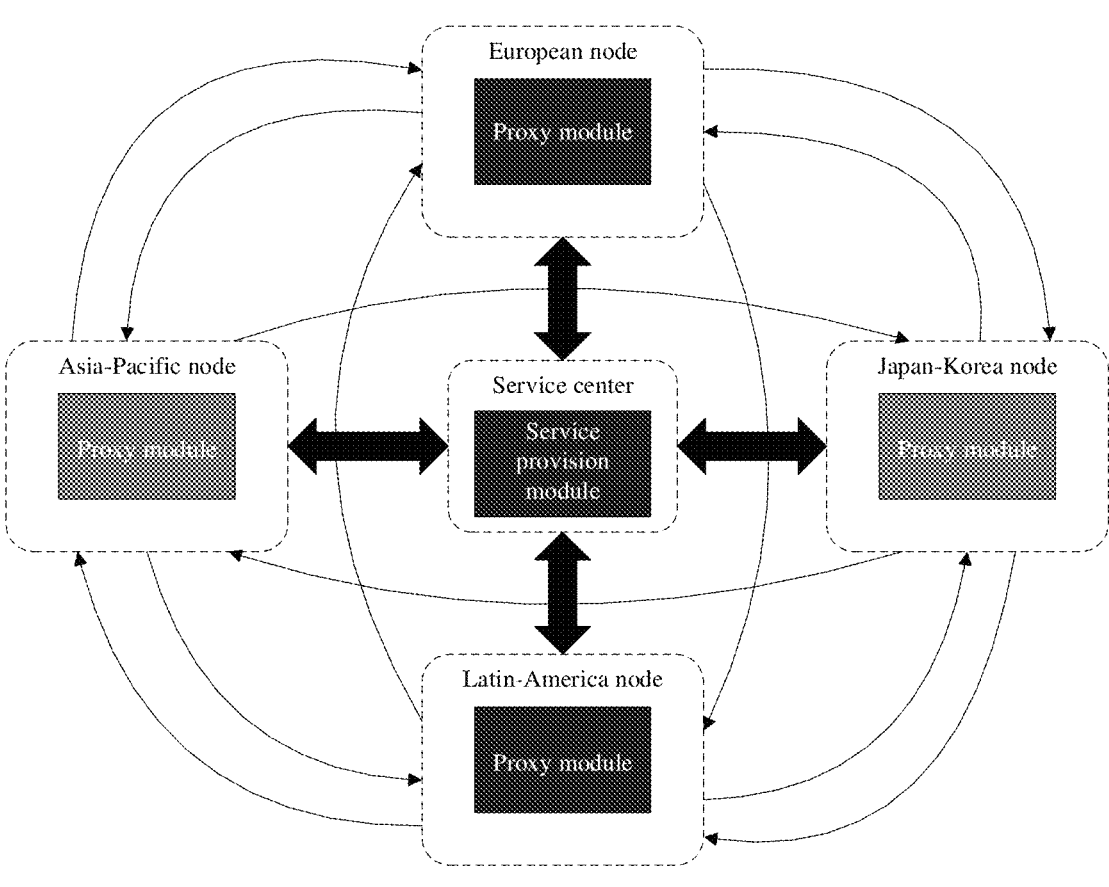

In addition, according to the first embodiment, where the number of smart card management apparatuses is large, and the number of public IP addresses available in the current Internet environment is small, it is not possible to assign a fixed public IP address for long-term use to each of the smart card management apparatuses. This embodiment provides another distributed management system, as illustrated in FIG. 3A, FIG. 3B, and FIG. 3C. The proxy modules in an IDC equipment room are moved out and distributively deployed, and each of the proxy modules moved out from the IDC equipment room is assigned a pre-configured public IP address. Since one proxy module is capable of being connected to a plurality of smart card management apparatuses, and an internal IP address is assigned to each of the plurality of smart card management apparatuses. In this way, the number of public IP addresses assigned to the smart card management apparatuses is reduced, and flexible deployment of the smart card management apparatuses is achieved. Further, network routing between the smart card management apparatuses and the terminals is optimized, and operation costs are effectively reduced.

As illustrated in FIG. 3A to FIG. 3C, an architecture diagram of another distributed management system for smart card management apparatuses according to an embodiment of the present disclosure is provided. The system includes: a service provision apparatus belonging to a service center, a plurality of smart card management apparatuses, and a plurality of terminals.

According to this embodiment, the service provision apparatus includes a service provision center and two or more proxy modules, and in the case that each of the plurality of terminals and a smart card management module are registered in the service provision center, the smart card management apparatus authenticates the terminal by a proxy module assigned by the service provision center, such that the terminal accesses a network (that is, a second network) servicing the terminal.

In the case that a plurality of proxy modules are provided, the service provision center is located in an IDC equipment room, the plurality of proxy modules are distributively deployed according to the region where the terminal is located, and each of the plurality of proxy modules is assigned a pre-configured public network address; and In practice, assuming that the proxy module is a node deployed in the European region (referred to as a European node), then the smart card management apparatuses connected to the European node are deployed in various local area networks in the European region, that is, each being assigned an internal IP address. In this case, the proxy module assigned a public IP address forwards or exchanges data of the terminals and the smart card management apparatuses, such that P2P (point-to-point/end-to-end) communication is implemented between the smart card management apparatuses and the terminals. It may be understood that the public network address in this embodiment is a public IP address. For better description, the recitation of the public network address is used in some descriptions whereas the recitation of the public IP address is used in some other descriptions.

As illustrated in FIG. 3C, assuming that four nodes are deployed globally, for example, four proxy modules, the four proxy modules include: a proxy module serving as an Asia-Pacific node (deployed in the Asia-Pacific region), a proxy module serving as a Latin-America node (deployed in the Latin-America region), a proxy module serving as a Japan-Korea node (deployed in the Japan-Korea region), and a proxy module serving as a European node (deployed in the European region). In this embodiment, the number of proxy modules is not limited, and the number of proxy modules and the regions where the proxy modules are deployed may be determined according to actual needs.

In FIG. 3C, all the plurality of proxy modules connected to the service provision center form a star topological structure, and any two of the plurality of proxy modules are interconnected and interworked. The service provision center may be a service platform with a plurality of nodes deployed globally. In this embodiment, the service provision center may be located at a cloud end or a hybrid cloud of a service provider.

In the case that the proxy modules serving as the global nodes are started, the proxy modules need to be connected to the service provision center (that is, a registration process of the proxy modules described hereinafter). In this way, the service provision center is capable of clearly acknowledging locations and active states of the proxy modules. Further, the service provision center dynamically updates the locations of the other proxy modules to each of the proxy modules, such that the proxy modules acknowledge presence of each other.

In a commercial environment, generally a plurality of smart card management apparatuses are deployed, and the smart card management apparatuses need to be deployed as "close" as possible to the terminals. In a non-full cone NAT network environment, the communication between the smart card management apparatuses and the terminals needs to be implemented by the proxy modules. Therefore, the proxy modules also need to be distributively deployed.

As such, the distributed management system achieves the operation of "removing" the smart card management apparatuses out from the IDC equipment room, to provide a basis for distributed deployment of the smart card management apparatuses. In some embodiments, the smart card management apparatuses may be deployed at user homes, or may be carried by users.

Third Embodiment

Figure 4A:
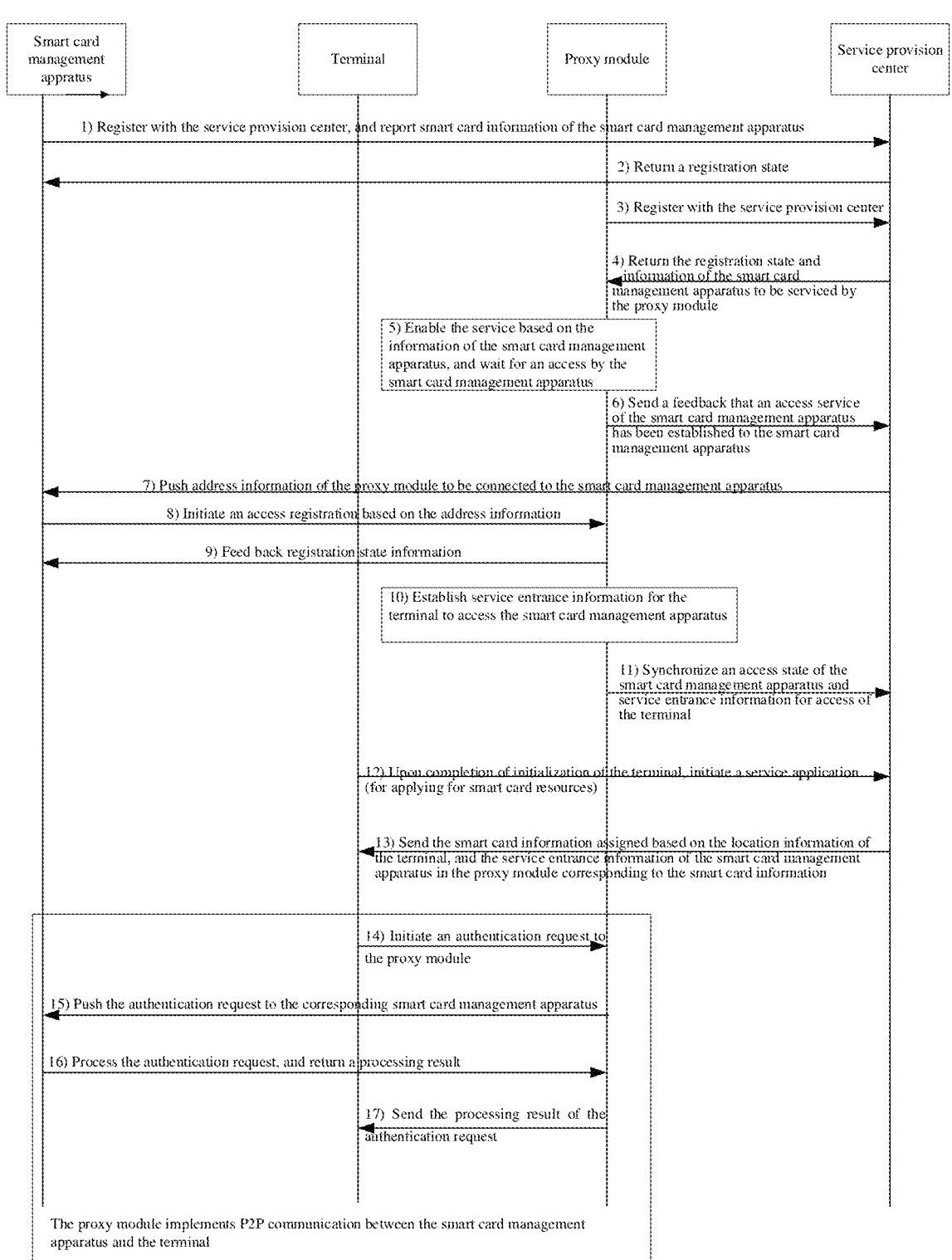
FIG. 4A and FIG. 4B are schematic diagrams of a management method for the distributed management system as illustrated in FIG. 3A.
Figure 4B:
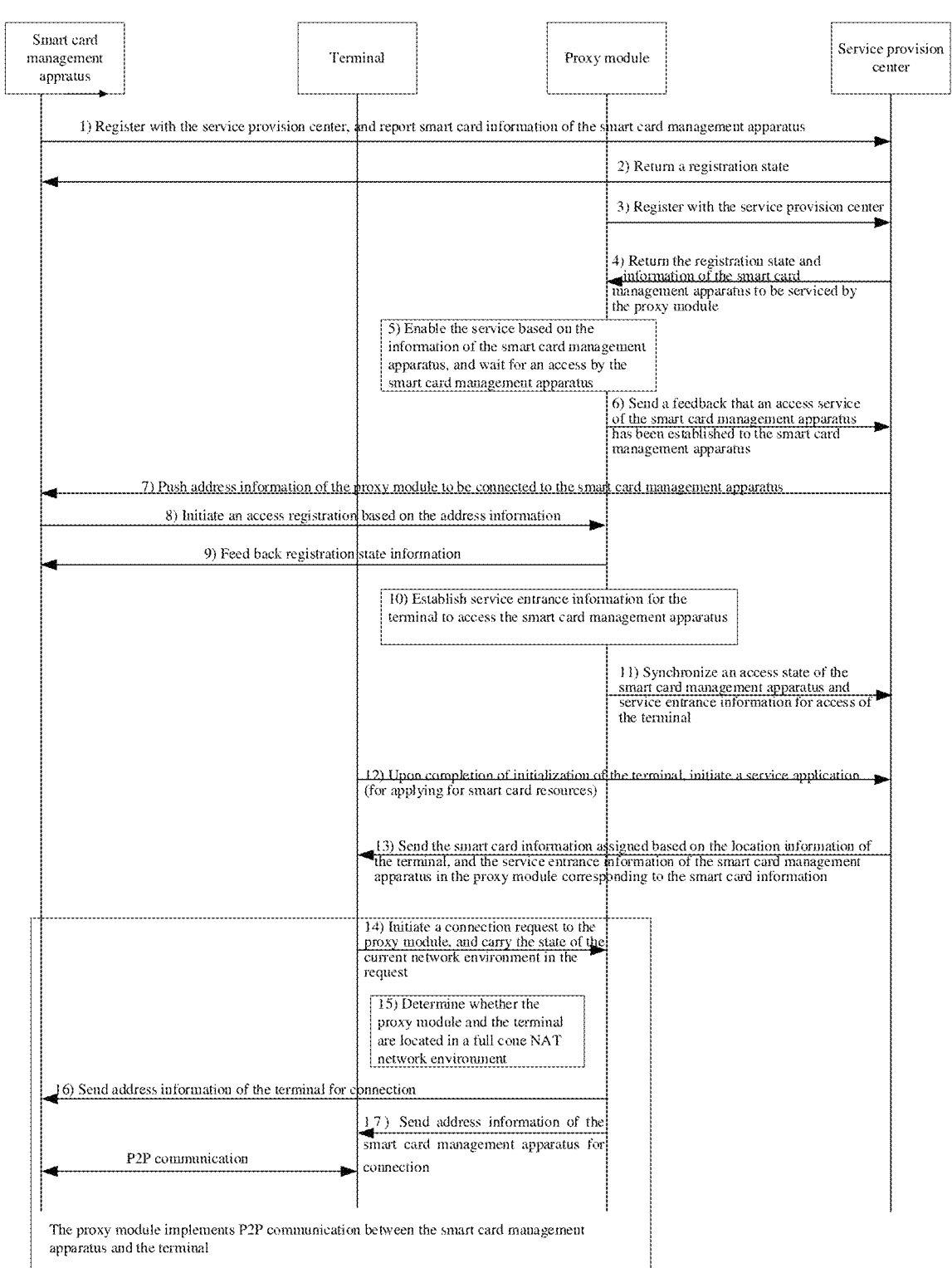
Figure 7:
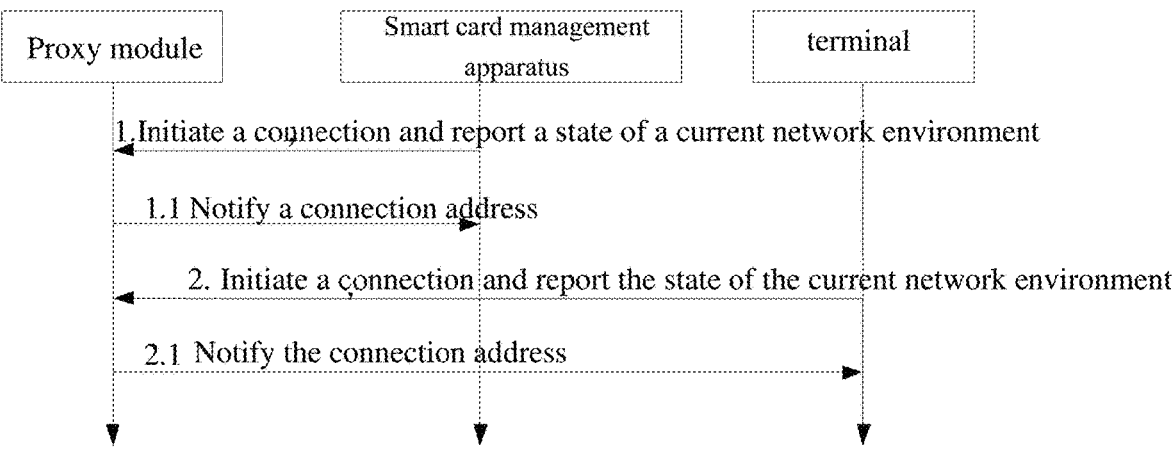

For better understanding of a communication process of the distributed management system with addition of network elements of the proxy modules, hereinafter description is given with reference to FIG. 4A to FIG. 7. FIG. 4A and FIG. 4B illustrate signaling diagrams of two overall interaction processes. FIG. 5 illustrates a flowchart of a management method where the service provision center serves as an execution subject. FIG. 6 is a flowchart of a management method where the proxy module serves as an execution subject. FIG. 7 illustrates some of a flowchart of the management method where the proxy module serves as a relay.

It should be noted that during initialization of various network element in the distributed management system. THE PROCESS OF INITIAL REGISTRATION OF THE SMART CARD MANAGEMENT APPARATUSES AND THE TERMINALS WITH THE SERVICE PROVISION CENTER IS SUBSTANTIALLY THE SAME AS THAT IN THE RELATED ART, and the interactions between the smart card management apparatuses and the terminals are implemented by the proxy module.

In this embodiment, the proxy module may select to implement one of two functions of a relay (a proxy server) and a P2P connection switch according to the network environment of the smart card management apparatus and the terminals.

That is, in a non-full cone NAT network environment, by the proxy module, the proxy module, the terminals are capable of accessing the smart card management apparatuses. In this case, the proxy module implements the function of a relay.

In a full cone NAT network environment, the proxy module is capable of exchanging addresses of the smart card management apparatuses with addresses of the terminals, and afterwards, the smart card management apparatuses are in direct communication with the terminals. That is, the proxy module implements the function of a P2P connection switch.

Therefore, the proxy module implements P2P communication between the smart card management apparatuses and the terminals.

As illustrated in FIG. 4A and FIG. 5, an execution subject of the management method according to this embodiment is the service provision center. The management method may include the following steps.

In A1, the service provision center receives smart card information from each of the plurality of smart card management apparatuses and location information of the smart card management apparatus.

For example, the smart card information may include: IMSI, ICCID and the like in-card file information of the smart card; a serial number of the smart card on the smart card management apparatus; and a serial number, a network address, and the like of the smart card management apparatus.

The location information of the smart card management apparatus may be network address information.

In A2, the service provision center receives a registration request from each of the plurality of proxy modules, wherein the registration request includes an identifier and location information of the proxy module sending the registration request.

In this embodiment, the registration request may include: a serial number, a check code, and the like information of the proxy module. The location information of the proxy module is mainly network address information (that is, a public network entrance). In this embodiment, other pre-configured information may be determined based on the network address information.

In A3, the service provision center returns information for servicing the smart card management apparatus based on the location information of the proxy module and the location information of the smart card management apparatus, such that the proxy module enables an access service based on the information.

It may be understood that the service provision center may assign information according in a pre-configured proxy module assignment policy.

In A4, in response to receiving information indicating that the access service is enabled from the proxy module, service provision center pushes address information (for example, network address information containing a public IP address) of the servicing proxy module to the smart card management apparatuses, such that the smart card management apparatuses are registered in the corresponding proxy modules.

In A5, the service provision center receives entrance information of the access services and access states of all the smart card management apparatuses serviced by the proxy module.

A typical access state may be a normal state, or an abnormal state, or the like. The entrance information of the access service may be information containing an IP address of the public network entrance, an access port, and the like that may be identified by the terminal for access a service.

In A6, the service provision center receives an application request for applying for a smart card resource from the terminal, wherein the service request includes location information of the terminal.

For example, the location information of the terminal may be current geographical location of the terminal, for example, longitude and latitude information.

Generally, the application request further includes: information and the like of an operator network servicing the terminal.

In A7, the service provision center assigns, based on the location information, the entrance information of the access service of the smart card management apparatus and the network address information of the proxy module, such that the terminal interacts with the smart card management apparatus upon accessing the proxy module, and accesses a second network.

In practice, the sequence for the service provision center to receive registration of the proxy module and registration of the smart card management apparatus is not limited. To be specific, the service provision center may first receive registration of the smart card management apparatus, or first receive registration of the proxy module. In FIG. 4A and FIG. 4B, the process that the smart card management apparatus first registers with the service provision center is illustrated as an example.

As illustrated in FIG. 4B and FIG. 6, an execution subject of the management method according to this embodiment is the proxy module. The management method may include the following steps.

In S1, the proxy module registers itself with the service provision center, acquires information for servicing the smart card management apparatus and interacts with the smart card management apparatus based on the information, acquires entrance information of an access service of the smart card management apparatus for servicing the terminal, and sends the entrance information of the access service to the service provision center.

In practice, step S1 may include the following substeps.

In S11, the proxy module initiates a registration request to the service provision center, wherein the registration request includes an identifier and location information of the proxy module.

In S12, the proxy module receives a registration response and the information for servicing the smart card management apparatus from the service provision center, and enables the access the service based on the information.

In S13, the proxy module receives an access registration message from the smart card management apparatus, wherein the access registration message is initiated by the smart card management apparatus based on the address information of the proxy module pushed by the service provision center; and In practice, the smart card management apparatus may carry state information of a network environment of the smart card management apparatus in the access registration message.

Generally, the access registration message may include: smart card information, a serial number, and the like information in the smart card management apparatus.

In S14, the proxy module feeds back registration state information based on the access registration message, establishes a connection to the smart card management apparatus, and synchronizes an access state of the smart card management apparatus and the entrance information of the access service for servicing the terminal to the service provision center.

In this embodiment, the entrance information of the access service includes IP information of an entrance of the public network, information of a port, and the like.

In S2, the proxy module receives an authentication request for authentication to the smart card management apparatus from the terminal, wherein the authentication request is initiated by the terminal in response to receiving the entrance information of the access service assigned by the service provision center and address information of the proxy module, and the authentication request includes smart card information paired with the terminal determined by the service provision center.

In one optional implementation, the terminal may also initiate a connection request to the proxy module. The connection request carries information for authentication, and carries state information of the network environment of the terminal.

Alternatively, the authentication request carries the information for authentication, and carries the state information of the network environment of the terminal.

The terminal of the smart card management apparatus may detect its own network environment using the Simple Traversal of UDP over NATs (STUN) protocol.

In S3, the proxy module searches for the smart card management apparatus based on the smart card information, such that the smart card management apparatus processes the authentication request whereupon the terminal accesses the second network.

In practice, the proxy module may implement communication between the smart card management apparatus and the terminal by the process illustrated by the lines and blocks in FIG. 4A, or by the process illustrated by the lines and blocks FIG. 4B.

For example, S3 may include the following substeps.

In S31, the proxy module determines whether the smart card management apparatus and the terminal are located in a full cone NAT network environment based on a pre-acquired network environment of the smart card management apparatus and the terminal.

It should be noted that full cone NAT is a case of the NAT network, P2P refers to point-to-point or end-to-end communication. In a full cone NAT network environment, two terminals may be directly connected and in communication with each other. Devices not in the full cone NAT network environment may be in communication with each other by an intermediate proxy module, which is also referred to as P2P communication.

In S32, in response to determining that the smart card management apparatus and the terminal are located in the full cone NAT network environment, sending the address information of the terminal to the smart card management apparatus, such that the terminal and the smart card management apparatus are in P2P communication for authentication of the terminal, as illustrated in FIG. 7.

In S33, in response to determining that the smart card management apparatus or the terminal is not located in the full cone NAT network environment, the proxy module forwards the authentication request to the searched smart card management apparatus.

In S34, the proxy module receives a processing result of the authentication request from the smart card management apparatus, and sends the processing result to the terminal whereupon the terminal accesses for the second network.

It may be understood that the network environment of the smart card management apparatus is information carried in the access registration message initiated by the smart card management apparatus; and the network environment of the terminal is information carried in the authentication request initiated by the terminal.

Further, the method as illustrated in any one of FIG. 4A to FIG. 6 may include the following steps that are not illustrated.

In S4, the proxy module periodically sends heartbeat information containing a state of the proxy module to the service provision center.

In S5, in response to receiving a connection request from a terminal of a region to which the proxy module does not belong, the proxy module sends information indicating that a proxy module of the region to which the terminal belongs fails to the service provision center.

Figure 8:
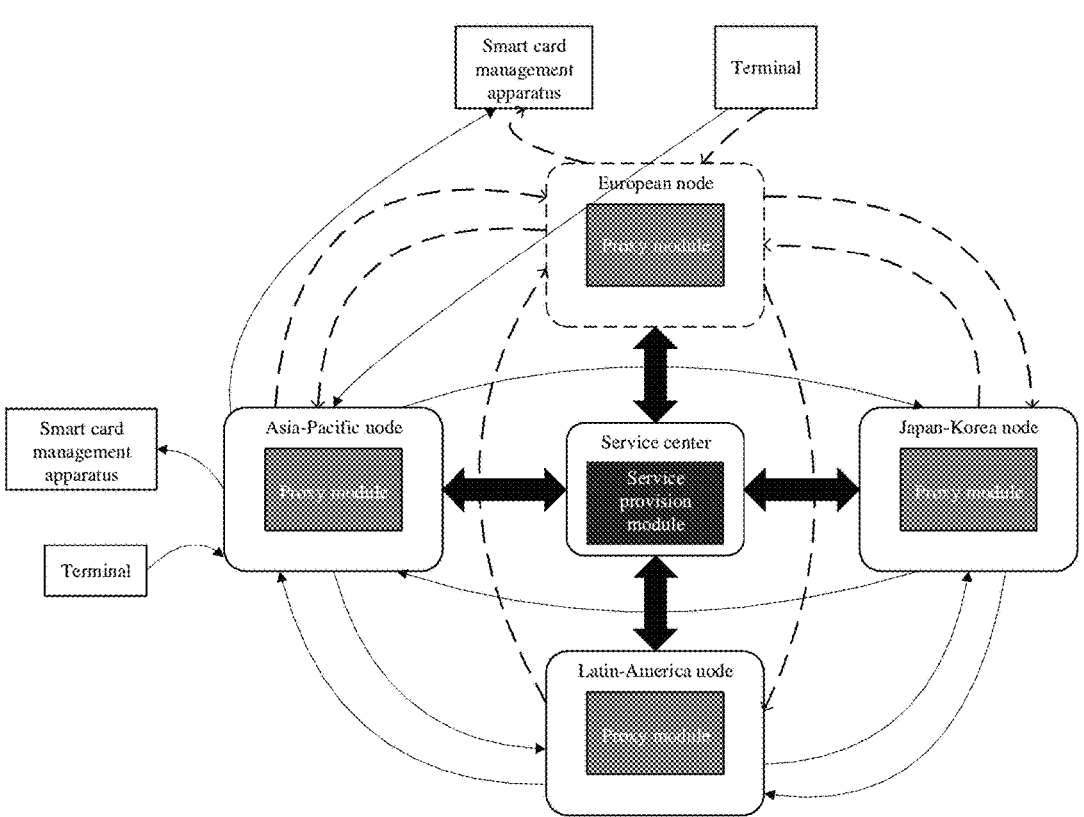
FIG. 8 is a schematic scenario diagram of service transfer in the case that a proxy module as illustrated in FIG. 3C fails.

As illustrated in FIG. 3C and FIG. 8, each proxy module is connected to a service center, and each proxy module may be connected to the other three proxy modules. In this way, all the proxy modules form a network topological structure, and the service provision center (not illustrated in FIG. 3C or FIG. 8) in the service center and the proxy modules form a star topological structure. Therefore, when a node in the proxy module falls, in one aspect, the service provision center and the other proxy modules may timely sense the failure and quickly and dynamically support the corresponding service of the failed node, whereas a user of the terminal is smoothly transitioned over the failure without any sense, and in another aspect, a warning and alert may be promoted in many ways to operation and maintenance personnel to notify the risk and repair the failure.

Assuming that the proxy module of the European node fails, then abnormal situations may be acknowledged from three aspects (the terminal, the service provision center and the other proxy modules.

Since on the architecture as illustrated in FIG. 2A and FIG. 2B, the smart card management apparatus is also connected to the service provision enter, it may be known from four aspects (that is, the terminal, the service provision center, the other proxy modules, and the smart card management apparatus) that the "European node" fails. Therefore, a false alarm rate of any proxy module is extremely low.

In practice, each terminal may be pre-configured with the location information (that is, the public IP address information) of all the proxy modules, and when the default proxy module is not available, the terminal is switched to the other nodes sequentially.

When the smart card management apparatus and the terminal are both pre-configured with the public IP address information of all the proxy modules, and the smart card manager apparatus, upon start, is connected to all the proxy modules. When a proxy module fails, the terminal may automatically trigger transfer of connection to the other proxy modules, and the smart card management apparatus itself has been connected to all the other modules. Therefore, as long as the terminal is connected to the other proxy modules, the terminal is capable of communicating with a most adjacent smart card management apparatus.

In another optional implementation, when the proxy module connected to the terminal fails, the abnormality of the proxy module may be reported to the service provision center, and the service provision center dispatches information to implement dynamic routing.

As exemplified in FIG. 8, assuming that the "European node" fails, then all the connections between European node and the outside are interrupted (in FIG. 8, the dotted lines represent the failed "European node" and the dotted lines also represent the interrupted connections). In this case, the service center may check the abnormality (for example, the service center checks whether the connections are abnormal according to heartbeat information fed back by the proxy modules), the other network elements (the smart card management apparatus, the terminal, and the other normal proxy modules) may also notify this event. In this case, the operation and maintenance personnel may be notified to inspect this problem.

Meanwhile, in response to detecting that the defaulted "European node." i.e., the proxy module, fails to be connected, the terminal initiates a service request to the "Asia-Pacific node" according to pre-configured information of the proxy module. The "Asia-Pacific node" has been normally connected to the European node and has exchanged information, and the smart card management apparatus has also been connected to the European node. Therefore, in this case, the "Asia-Pacific node." i.e., the proxy module, directly forwards the service request of the terminal to smart card management apparatus.

In practice, the location information of all the proxy modules may be pre-configured in the smart card management apparatus and the terminal, and all the proxy modules are made to be interconnected.

In practice, this embodiment provides the following connection policies.

Each proxy module is connected to a maximum of eight other proxy modules.

Each smart card management apparatus and terminal are connected to only two proxy modules.

This effectively reduces network complexity of the entire distributed management system.

In this embodiment, the distributively deployed proxy modules are interconnected. When some of the proxy modules fail, the other normal proxy modules in the network quickly serve as redundancy nodes of the fault nodes and continue to service the terminals. In this way, the terminals are constantly serviced, and quality of service is also optimized.

In this embodiment, the terminal may also record time elapsed for each authentication request, time for authentication, geographical location of terminal, used proxy module and the like information, and periodically upload the record information to the service provision center. The service provision center may conduct a comprehensive evaluation on the proxy modules based on the periodically reported information.

In addition to addressing the problem of failed nodes, the distributed management system according to the embodiments of the present disclosure optimizes quality of service of the system, and dynamically adjusts binding relationships between the terminals and the proxy modules, thereby achieving dynamic routing and optimal quality of service.

A person skilled in the art may envisage that various exemplary units and algorithm steps described with reference to the embodiments of the present disclosure given herein may be practiced in the form of electronic hardware or a combination of computer software and electronic hardware. Whether such functions are implemented in the form of software or hardware depends on the specific application and the design restrictions applied to the entire system. Professional technical personnel may implement the described functions by using different methods for each specific application. However, such implementation shall not be deemed as going beyond the scope of the present disclosure.

A person skilled in the art would clearly acknowledge that for ease and brevity of description, the specific operation processes of the above described systems, apparatuses and units may be referenced to the relevant portions in the above described method embodiments, which are thus not described herein any further.

It should be understood that the steps according to the embodiments of the present disclosure, unless otherwise specified, are performed in any order according to actual needs. The disclosed apparatus and method may be practiced in other manners. The above described device embodiments are merely illustrative. For example, the unit division is merely logical function division and may be other divisions in actual practice. For example, multiple units or components may be combined or integrated into another device, or some features can be ignored or not performed. In addition, the displayed or discussed mutual couplings or direct couplings or communication connections may be implemented through some interfaces. The indirect couplings or communication connections between the devices or units may be implemented in electronic, mechanical or other forms.

The units which are described as separate components may be physically separated or may be not physically separated, and the components which are illustrated as units may be or may not be physical units, that is, the components may be located in the same position or may be distributed into a plurality of network units. Some of or all of the units may be selected according to actual needs to achieve the objectives of the solutions of the embodiments.

In addition, functional units in the embodiments of the present disclosure may be integrated into one processing unit, or each of the units may exist along physically, or two or more units may be integrated into one unit.

In the case that the functions are implemented in a form of a software functional unit and sold or used as an independent product, the units may be stored in a computer readable storage medium. Based on such understanding, the technical solutions of the present disclosure essentially, or the part contributing to the related art, or a part of the technical solutions may be implemented in a form of a software product. The computer software product is stored in a storage medium and includes several instructions to cause a computer device (which may be a personal computer, a server, a network device, or the like) to perform all or some of steps of the methods described in the embodiments of the present disclosure.

It should be noted that, in this specification, terms "comprises," "include," "contain," and any other variations thereof are intended to cover a non-exclusive inclusion, such that a process, method, article, or apparatus, that comprises, has, includes, or contains a list of elements does not include only those elements but may include other elements not expressly listed or inherent to such process, method, article, or apparatus. An element proceeded by "comprises . . . a." "has . . . a," "includes . . . a." or "contains . . . a" does not, without more constraints, preclude the existence of additional identical elements in the process, method, article, or apparatus.

In addition, those skilled in the art shall understand that, although some embodiments described herein include some features included in other embodiments, rather than other features, a combination of the features in different embodiments signifies that the features are within the scope of the present disclosure and different embodiments may be derived.

Although some exemplary embodiments of the present disclosure are described with reference to the accompanying drawings, a person skilled in the art would make various modifications and variations without departing from the spirit and the scope of the present disclosure. Such modifications and variations shall be considered as falling within the scope defined by the appended claims.

What is claimed is:

1. A distributed management system of smart card management apparatuses, comprising:

a service provision center;

one or more proxy modules; and a plurality of the remote nodes, wherein each of the plurality of the remote nodes comprises a corresponding smart card management apparatus, and a corresponding terminal, respectively, wherein the smart card management apparatus is connected to the terminal through a communication channel, each of the plurality of the remote nodes is located in a region where the corresponding terminal is located, wherein each smart card management apparatus and each terminal is registered at the service provision center through communication channels between the smart card management apparatus and service provision center, and between the terminal and service provision center, the smart card management apparatus authenticates the terminal through the one or more proxy module assigned by the service provision center, and the terminal accesses a network serving the terminal.

2. The distributed management system according to claim 1, wherein when one proxy module is used, the proxy module and the service provision center are both located in an Internet Data Center (IDC) equipment room and share a same public network address, and each of the plurality of smart card management apparatuses is located in regions where each of the corresponding terminals is located, respectively, and each of the plurality of smart card management apparatuses, is assigned a pre-configured public network address.

3. The distributed management system according to claim 1, wherein when a plurality of proxy modules is used, the service provision center is located in an IDC equipment room or at a cloud end, the plurality of proxy modules is separately deployed according to the region where the plurality of terminals is located, and each of the plurality of proxy modules is assigned a pre-configured public network address; and each of the plurality of smart card management apparatuses is connected to one of the plurality of proxy modules located in the region, each of the plurality of smart card management apparatuses, is assigned an internal network address, each of the plurality of proxy modules is used when each of the plurality of corresponding smart card management apparatus authenticates each of corresponding terminals, respectively, and each of the plurality of proxy modules is in point-to-point communication with the corresponding terminals.

4. The distributed management system according to claim 3, wherein each of the plurality of proxy modules forwards interactive data between the corresponding smart card management apparatus and the service provision center; and the plurality of proxy modules connects to the service provision center in star topological configuration, and any two of the plurality of proxy modules are interconnected, and/or the service provision center is located at a cloud end or a hybrid cloud of a service provider.

* * * * *